Sept. 5, 1950 R. B. EDWARDS 2,521,052
CONTROLLED CARRIER TRANSMITTER
Filed March 30, 1946
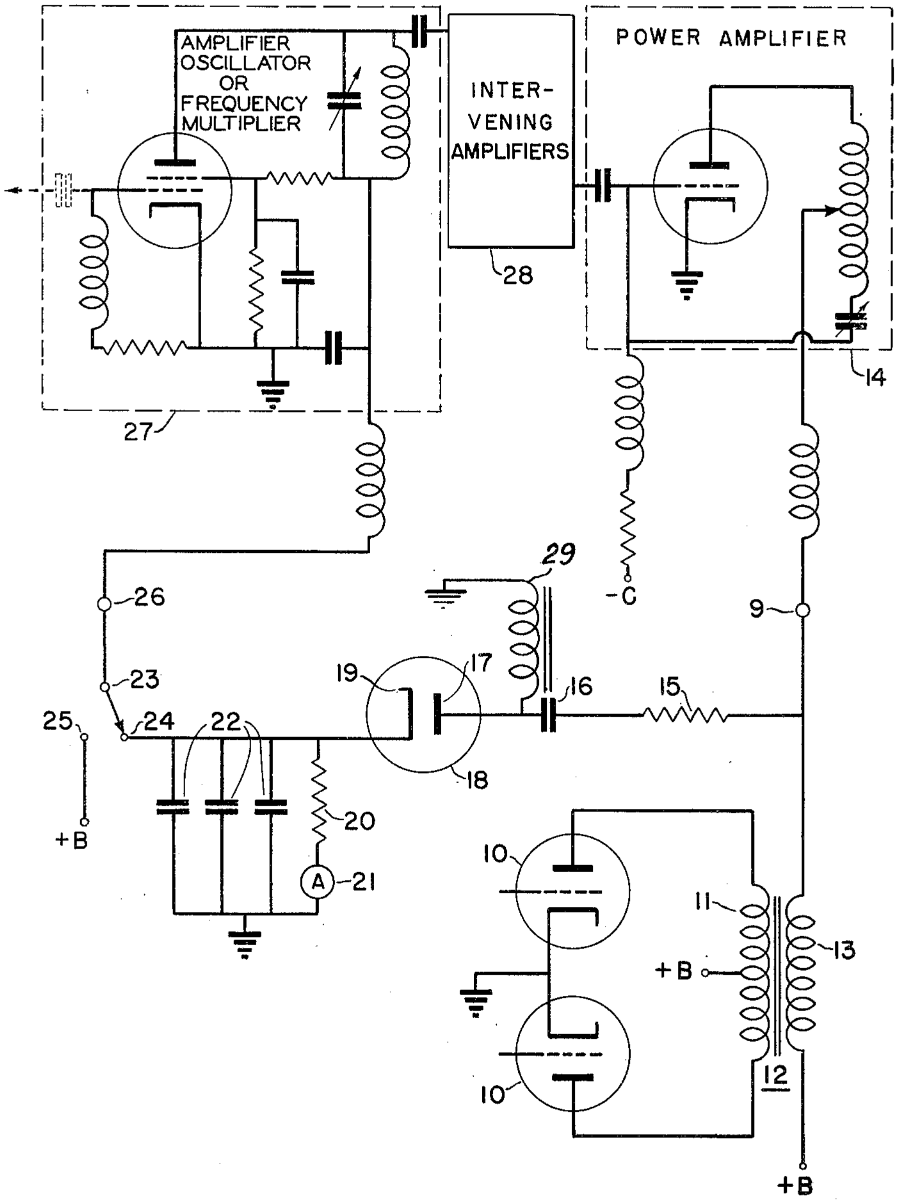
Inventor
Robert B. Edwards
By Robert T. Killman
Attorney Patented Sept. 5, 1950 2,521,052

UNITED STATES PATENT OFFICE 2,521,052

CONTROLLED CARRIER TRANSMITTER

Robert B. Edwards, Baltimore, Md., assignor to Bendix Aviation Corporation, Towson, Md., a corporation of Delaware Application March 30, 1946, Serial No. 658,424

17 Claims. (Cl. 332—38)

This invention relates to transmitters of the controlled carrier type in which the amplitude of the carrier wave is automatically varied in accordance with the amplitude of the audio frequency modulation as averaged over a short period of time.

Previously known controlled carrier arrangements are of two general types. In one type the plate supply voltage of a plate modulated amplifier is varied by a saturable reactor which is controlled by the D. C. plate current of a class B amplifier. In the other type the plate-cathode circuit of the modulator tubes is in series with the B supply circuit of the modulated tubes.

Each of these arrangements has its disadvantages. The use of saturable reactors is not only expensive, but results in increased space and weight requirements, which are undesirable, especially in aircraft installations. The efficiency of the transmitter, is reduced by the drain on B supply voltage occasioned by the use of the second type of arrangement.

It is an object of this invention to provide a controlled carrier transmitter in which substantially 100 per cent modulation will be obtained for all amplitudes of modulation.

It is a further object of this invention to provide a controlled carrier transmitter in which the drain on the B supply occasioned by carrier control is reduced to a low value.

It is another object of this invention to provide a controlled carrier transmitter in which the added space and weight requirements incident to carrier control are kept to a low value.

It is still another object of this invention to provide a controlled carrier transmitter in which the carrier control feature does not greatly increase the cost of the transmitter.

The objects and advantages of the invention are attained by an arrangement in which the modulating voltage is rectified, filtered and employed as the plate supply voltage for the buffer amplifier stage or one of the early amplifier stages of the radio frequency amplifying system of the transmitter.

Other objects and advantages of the invention will become apparent from the consideration of the following specification when taken in conjunction with the accompanying drawing, in the single figure of which there is illustrated a schematic circuit diagram of a modulating circuit and a portion of the radio frequency amplifying system of a transmitter embodying the invention.

Referring now more particularly to the drawing, there is illustrated a conventional modulator circuit comprising a pair of vacuum tubes 10, 10 having their anodes connected respectively to the ends of the primary winding 11 of the modulation transformer 12. One end of the secondary winding 13 of the transformer 12 is connected to a source of potential indicated plus B, and the other end is connected to the "high voltage input" terminal 9 of a conventional class C radio frequency amplifier 14. The terminal 9 is also connected through a resistor 15 and a condenser 16 to the anode 17 of a rectifier tube 18. The cathode 19 of the tube 18 is connected through a resistor 20 and a current indicating meter 21 to ground. The resistor 20 and the meter 21 are by-passed by one or more condensers 22. The cathode 19 is also connected to a contact 24 of a single-pole, double-throw switch 23. The arm of the switch 23 is connected to the "high-voltage input" terminal of the oscillator, buffer amplifier, or early amplifier stage 27 of the radio frequency generating system of the transmitter, of which the intervening amplifier stages are indicated by a block 28 and which terminates in the power amplifier stage 14. The other contact of the switch 23 is connected to a high voltage source indicated plus B. The circuit 27 may, if desired, be a frequency multiplying stage of the generating system.

Considering now the operation of the above described arrangement when the arm of the switch 23 is connected to the contact 25, it will be noted that the modulator comprising the tubes 10 and the modulation transformer 12 will effectively modulate the voltage supply to the power amplifier 14 from the source plus B. In this condition the circuit 27 is supplied with anode voltage from the supply source connected to the switch contact 25. The operation of the circuit will be conventional in every respect with no control of average carrier current.

With the arm of the switch 23 in contact with the contact 24 the only voltage supplied to the anode circuit of the stage 27 will be that which is developed across the resistor 20 due to currents flowing in the rectifier tube 18. Due to the stopping action of the condenser 16 there will be no direct current potential applied to the rectifier 18. It will be seen, therefore, that the voltage developed across the resistor 20 will constitute the rectified output of the modulation transformer secondary winding 13.

The resistor 20 and the condenser 22 constitute a filtering network which effectively removes the audio characteristic of the modulating wave, integrates it, and produces an effective voltage across the resistor 20 which is proportional to the average value of the modulating potential. The resistors 15 and 20 additionally serve as a voltage divider to provide a suitable step down of the modulating voltage to the buffer stage.

It has been shown that the anode potential applied to the buffer stage of the transmitter is directly proportional to the average amplitude of the modulating potential applied to the final stage of the transmitter. Assuming proper bias conditions in the stages between the circuit 27 and the final modulated amplifier 14, the variation of the output of the buffer amplifier 27 will cause an equivalent variation of the output of the final amplifier 14. Thus, it will be seen, the output of the final amplifier 14 will be proportional to the amplitude of the modulation applied thereto.

In addition to the above described mode of operation, it should be considered that the input power drawn by the final amplifier will be a variable quantity which is proportional to the amplitude of the modulation applied thereto, and, therefore, by proper adjustment of the voltage divider comprising the resistors 15 and 20 the system may be made to operate in such a manner that substantially 100 per cent modulation of the final amplifier 14 is attained at all levels of the applied modulating signal.

While the foregoing disclosure has been restricted to the embodiment of the invention which is now preferred, many changes of circuit arrangement, falling within the scope of the invention as defined by the appended claims, will suggest themselves to those skilled in the art. It should therefore be understood that the scope of the invention is not to be restricted to the embodiment described herein.

What is claimed is:

1. In a transmitter comprising a multi-stage radio-frequency generating system including a buffer amplifier and a succeeding amplifier stage: means supplying modulating voltage to the said succeeding amplifier stage; means rectifying and integrating a part of said modulating voltage; and means applying said rectified and integrated voltage as plate voltage to said buffer amplifier.

2. In a transmitter comprising a multi-stage radio-frequency generating system including an oscillator and a succeeding amplifier stage: means supplying modulating voltage to the said amplifier stage; means rectifying and integrating part of said modulating voltage; and means applying said rectified and integrated voltage as plate voltage to said oscillator.

3. In a transmitter comprising a multi-stage radio-frequency generating system including a frequency multiplier and a succeeding amplifier stage: means supplying modulating voltage to the said amplifier stage; means rectifying and integrating a part of said modulating voltage; and means applying said rectified and integrated voltage as plate voltage to said frequency multiplier.

4. In a transmitter comprising a multi-stage radio-frequency generating system including an amplifier stage having a plate voltage supply circuit: means impressing modulating voltage on said plate voltage supply circuit; means rectifying and integrating a part of the alternating component of the voltage of said plate voltage supply circuit; and means applying said rectified and integrated voltage directly as plate voltage to a stage of said system preceding said amplifier stage.

5. In a transmitter comprising a multi-stage radio-frequency generating system including a buffer amplifier and a succeeding amplifier stage having a plate voltage supply circuit; means rectifying and integrating a part of the alternating component of the voltage of said plate voltage supply circuit; and means applying said rectified and integrated voltage as plate supply voltage to the buffer amplifier of said system.

6. In a transmitter comprising a multi-stage radio-frequency generating system including an oscillator and a succeeding amplifier stage having a plate voltage supply circuit: means impressing modulating voltage on said plate voltage supply circuit: means rectifying and integrating a part of the alternating component of the voltage of said plate voltage supply circuit; and means applying said rectified and integrated voltage as plate supply voltage to the oscillator of said system.

7. In a transmitter comprising a multi-stage radio-frequency generating system including a frequency multiplier and a succeeding amplifier stage having a plate voltage supply circuit; means impressing modulating voltage on said plate voltage supply circuit: means rectifying and integrating a part of the alternating component of the voltage of said plate voltage supply circuit; and means applying said rectified and integrated voltage as plate supply voltage to the frequency multiplier of said system.

8. In a transmitter comprising a multi-stage radio-frequency generating system including a stage having a plate voltage supply circuit: a modulator; means impressing the output of said modulator of said plate voltage supply circuit; means rectifying and integrating a part of the alternating component of the voltage of said plate voltage supply circuit; and means applying said rectified and integrated voltage directly as plate voltage to a stage of said system preceding the first mentioned stage.

9. In a transmitter comprising a multi-stage radio-frequency generating system including a buffer amplifier and a succeeding amplifier stage having a plate voltage supply circuit: a modulator; means impressing the output of said modulator on said plate voltage supply circuit; means rectifying and integrating a part of the alternating component of the voltage of said plate voltage supply circuit; and means applying said rectified and integrated voltage as plate voltage to said buffer amplifier.

10. In a transmitter comprising a multi-stage radio-frequency generating system including an oscillator and a succeeding amplifier stage having a plate voltage supply circuit: a modulator; means impressing the output of said modulator on said plate voltage supply circuit; means rectifying and integrating a part of the alternating component of the voltage of said plate voltage supply circuit; and means applying said rectified and integrated voltage as plate voltage to said oscillator.

11. In a transmitter comprising a multi-stage radio-frequency generating system including a frequency multiplier and a succeeding amplifier stage having a plate voltage supply circuit: a modulator; means impressing the output of said modulator on said plate voltage supply circuit; means rectifying and integrating a part of the alternating component of the voltage of said plate voltage supply circuit; and means applying said rectified and integrated voltage as plate voltage to said oscillator.

12. In a transmitter comprising a multi-stage radio-frequency generating system including an amplifier stage, said stage having a plate voltage supply circuit: a modulator; means impressing the output of said modulator on the plate voltage supply circuit of said amplifier stage; a rectifier connected between the plate voltage supply circuits of said amplifier stage and an earlier stage of said system; a condenser in series with said rectifier; and an integrating circuit connected between said rectifier and the plate voltage supply circuit of said earlier stage.

13. In a transmitter comprising a multi-stage radio-frequency generating system including a buffer amplifier and a final power amplifier stage, said stages having plate voltage supply circuits: a modulator; means impressing the output of the said modulator on the plate voltage supply circuit of said final stage; a rectifier connected between the plate voltage supply circuits of said final stage and said buffer amplifier; a condenser connected in series with said rectifier; and an integrating circuit connected between said rectifier and the plate voltage supply circuit of said buffer amplifier stage.

14. In a transmitter comprising a multi-stage radio-frequency generating system including an oscillator and a final power amplifier stage, said stages having plate voltage supply circuits: a modulator; means impressing the output of the said modulator on the plate voltage supply circuit of said final stage; a rectifier connected between the plate voltage supply circuits of said final stage and said oscillator; a condenser connected in series with said rectifier; and an integrating circuit connected between said rectifier and the plate voltage supply circuit of said oscillator stage.

15. In a transmitter comprising a multi-stage radio-frequency generating system including a frequency multiplier and a final power amplifier stage, said stages having plate voltage supply circuits: a modulator; means impressing the output of the said modulator on the plate voltage supply circuit of said final stage; a rectifier connected between the plate voltage supply circuits of said final stage and said frequency multiplier; a condenser connected in series with said rectifier; and an integrating circuit connected between said rectifier and the plate voltage supply circuit of said frequency multiplier stage.

16. In a transmitter comprising a multi-stage radio frequency generating system: means supplying modulating voltage to a stage of said system; means rectifying and integrating a part of said modulating voltage; and means applying said rectified and integrated voltage directly to a stage in the said system preceding the first mentioned stage as the sole component of the plate voltage thereof.

17. In a transmitter comprising a radio frequency generating system including a plurality of cascaded radio frequency signal translating stages: means supplying modulating voltage to one of said stages; means rectifying and filtering a part of said modulating voltage; and means applying said rectified and filtered voltage directly to one of said stages preceding the first mentioned stage as plate voltage.

ROBERT B. EDWARDS.

REFERENCES CITED

The following references are of record in the file of this patent:

UNITED STATES PATENTS

| Number | Name | Date |
|---|---|---|
| 2,032,312 | Ring | Feb. 25, 1936 |
| 2,169,019 | Bohm et al. | Aug. 8, 1939 |
| 2,227,206 | Waller | Dec. 31, 1940 |
| 2,232,080 | Seidebach | Feb. 18, 1941 |